United States Patent
Graham et al.

(10) Patent No.: US 10,889,373 B2
(45) Date of Patent: Jan. 12, 2021

(54) AERIAL IMAGERY SYSTEMS AND METHODS

(71) Applicant: Geocue Group, LLC, Madison, AL (US)

(72) Inventors: Lewis Graham, Madison, AL (US); Nancy Graham, Madison, AL (US); Derek Morris, Decatur, AL (US); Carl Steven Riddell, Madison, AL (US); Hai Quang Dinh, Huntsville, AL (US)

(73) Assignee: GEOCUE GROUP, LLC, Madison, AL (US)

( * ) Notice: Subject to any disclaimer, the term of this patent is extended or adjusted under 35 U.S.C. 154(b) by 0 days.

(21) Appl. No.: 15/909,853

(22) Filed: Mar. 1, 2018

(65) Prior Publication Data

US 2018/0297700 A1   Oct. 18, 2018

Related U.S. Application Data

(60) Provisional application No. 62/486,843, filed on Apr. 18, 2017.

(51) Int. Cl.
| | | |
|---|---|---|
| *G03B 15/00* | (2006.01) | |
| *B64D 47/08* | (2006.01) | |
| *H04N 1/00* | (2006.01) | |
| *B64C 39/02* | (2006.01) | |
| *G05D 1/00* | (2006.01) | |
| *G08G 5/00* | (2006.01) | |

(52) U.S. Cl.
CPC ............ *B64C 39/024* (2013.01); *B64D 47/08* (2013.01); *G05D 1/0094* (2013.01); *B64C 2201/127* (2013.01); *B64C 2201/145* (2013.01); *G08G 5/0069* (2013.01)

(58) Field of Classification Search
None
See application file for complete search history.

(56) References Cited

U.S. PATENT DOCUMENTS

| | | | |
|---|---|---|---|
| 2014/0316616 A1* | 10/2014 | Kugelmass | ............ G05D 1/101 701/8 |
| 2018/0124309 A1* | 5/2018 | Tierney | .............. H04N 5/23222 |
| 2018/0373136 A1* | 12/2018 | Rozenberg | ............. B64D 47/08 |

* cited by examiner

*Primary Examiner* — Adan D Tissot
*Assistant Examiner* — Laura E Linhardt
(74) *Attorney, Agent, or Firm* — Dennen IP Law, LLC

(57) ABSTRACT

A drone system has a camera mounted to a frame of a drone, the camera configured to acquire image data upon receipt of a signal from a flight controller and a precision location device configured for continuously obtaining location data. Additionally, the drone system has a computing device configured for receiving a signal indicating that an image has been acquired, the computing device configured for transmitting a signal to a precision location device indicating that an image has been acquired, and the precision location device is further configured to record event data associated with a time indicating when the image was acquired.

39 Claims, 12 Drawing Sheets

AERIAL IMAGERY SYSTEMS AND METHODS

CROSS REFERENCE TO RELATED APPLICATION

This application claims priority to U.S. Provisional Patent Application Ser. No. 62/486,843 and entitled Low Cost Direct Geopositioning System filed on Apr. 18, 2017, which is incorporated herein by reference.

BACKGROUND

Oftentimes, unmanned aircraft, e.g., drones, guided by onboard computers are used to collect images for photogrammetric mapping of a topographic area. In this regard, the drone is flown over the area that is to be mapped, and an onboard camera captures a large number of overlapping images of the topography of the area. The images are then used in post-processing to generate a three-dimensional representation of the topographic area imaged. Exemplary types of post-processing algorithms include structure from motion algorithms or semiglobal matching algorithms. The three-dimensional representations of the topographic area may be used, for example, in performing survey-type operations, such as volumetric analysis.

In photogrammetric imaging a system solves for, among other parameters, the position (X, Y, Z location in space) and orientation (pitch yaw, roll) of the camera (s) that are acquiring the images. There are a wide variety of mechanisms for solving for position and orientation. For mapping purposes, it is important that position of the onboard camera be tied to a geodetic coordinate system, i.e., a set of reference points that are used to locate places on earth.

One solution for tying the onboard camera to a geodetic coordinate system uses image identifiable markers in the topographic area being imaged. In aerial mapping, these markers are often referred to as ground control points. Ground control points are typically large physical markers on the ground that are strategically placed throughout the topographic area. The ground control points are then used in post-processing to accurately map the topographic area. In such a solution, to ensure accuracy and tie the images taken to a real-world coordinate system, a large number of ground control points must be used and the exact location of the ground control points must be used in the mapping process.

In the process, the number of ground control points used may be decreased if there is a way of measuring precisely where the camera is when each image is taken. There are various systems on the market for measuring the precise location of the camera when an image is taken. Exemplary systems include real-time kinematic (RTK) and post-processing kinematic (PPK) implementations of global navigation satellite system (GNSS) solutions.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
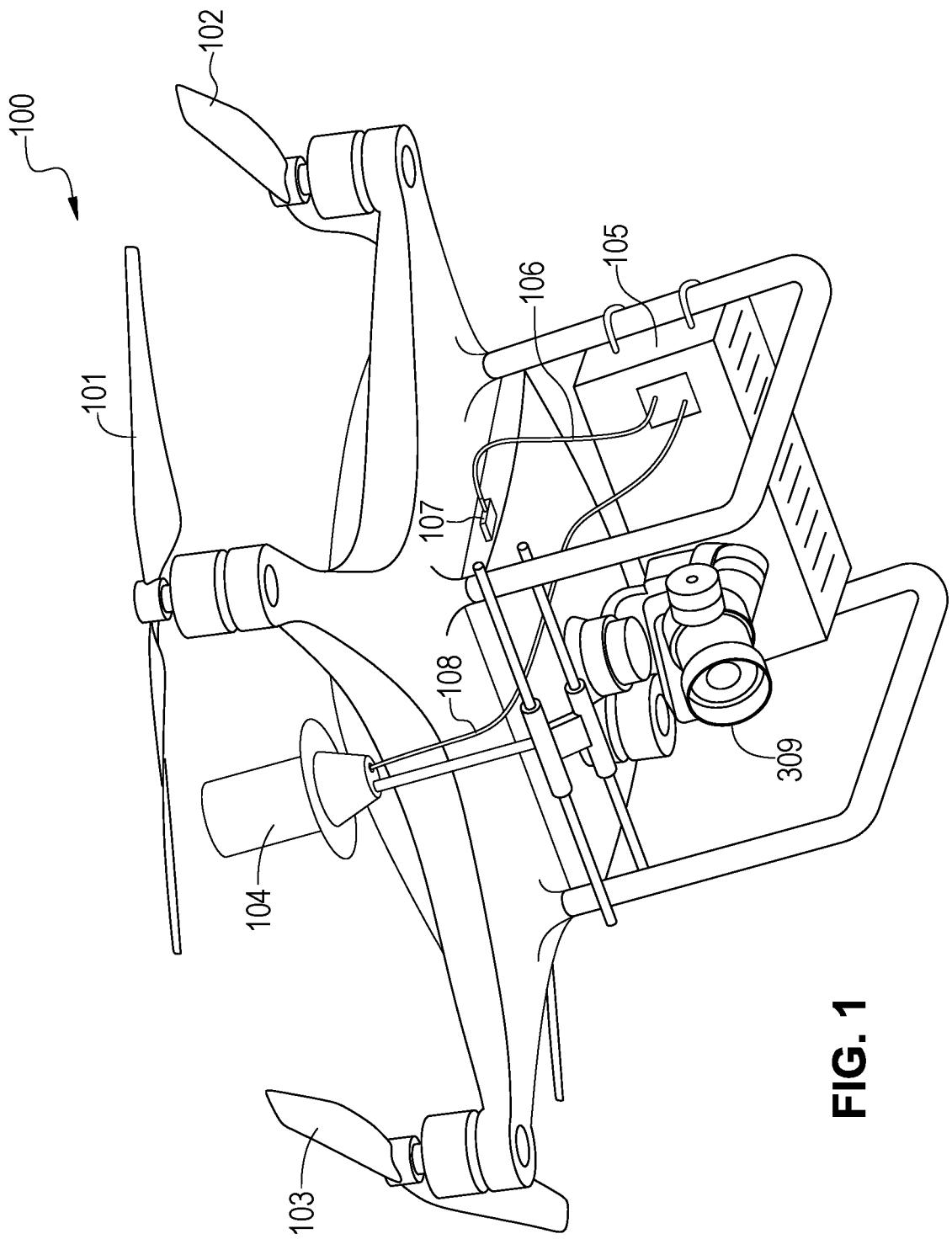
FIG. 1 is a perspective view of a drone in accordance with an embodiment of the present disclosure.

FIG. 1 is a perspective view of a drone 100 in accordance with an embodiment of the present disclosure. The drone 100 is shown for exemplary purposes and other drones or types of drones may be used in other embodiments.

The exemplary drone 100 comprises a plurality of propellers 101-103 that move the drone through a trajectory path. Note that only three propellers 101-103 are shown but fewer or more propellers may be used in other embodiments of the present disclosure. While the figure depicts a rotary wing drone, any other drone embodiment such as a fixed wing, "V" wing and so forth could be employed.

The exemplary drone 100 comprises a body 109 to which the propellers 101-103 are coupled. Further coupled to the drone 100 is a frame 110. Coupled to the frame are a camera 309, an antenna 104, and a direct geopositioning system (DSP) housing 105. Other implements may be attached to the drone frame 110 in other embodiments.

The drone camera 309 is any type of camera known in the art or future-developed for mounting on the drone frame 110 and taking photographs. As the drone 100 moves through the trajectory path, the camera 309 is instructed to take photographs at certain intervals, e.g., every few meters or every few seconds, from a control processor, which is described further herein.

The camera 309 is coupled to a secure digital (SD) port 107 that houses a modified SD card 111 in accordance with an embodiment of the present disclosure. In this regard, the modified SD card 111 comprises SD card circuitry for receiving and storing photographs obtained by the camera 309. In addition, the modified SD card 111 comprises a programmable logic device that operates independent of the SD card circuitry. Note that the programmable logic, which is described further herein, may be a separate and distinct printed circuit board that is disposed on the modified SD card 111. In operation, the logic listens to messages between the control processor/camera 309 and the modified SD card 111. Note that the SD card is further described herein with reference to FIG. 3. As the camera 309 takes a photograph, the camera 309 communicates with the modified SD card 111. Communications may include, for example various commands related to the camera operation, such as a command signal indicating that the camera 309 has just taken a photograph.

When the control processor or camera 309 sends a command to the modified SD card 111 that the camera 309 has taken a photograph, the programmable logic on the modified SD card intercepts the command and transmits a signal to the DPS housing. Electronics contained within the DPS housing determine the exact location of the drone 100 when the drone took the photograph via the antenna 104 coupled to the DSP housing 105 via a cable 108. In this regard, the DPS collects a time value associated the time the image is acquired and collects coordinate data associated with the location of the drone when the image is acquired. In postprocessing, the image acquired can be matched via the time values with the exact location of the drone 100 when the image is acquired.

Figure 2:
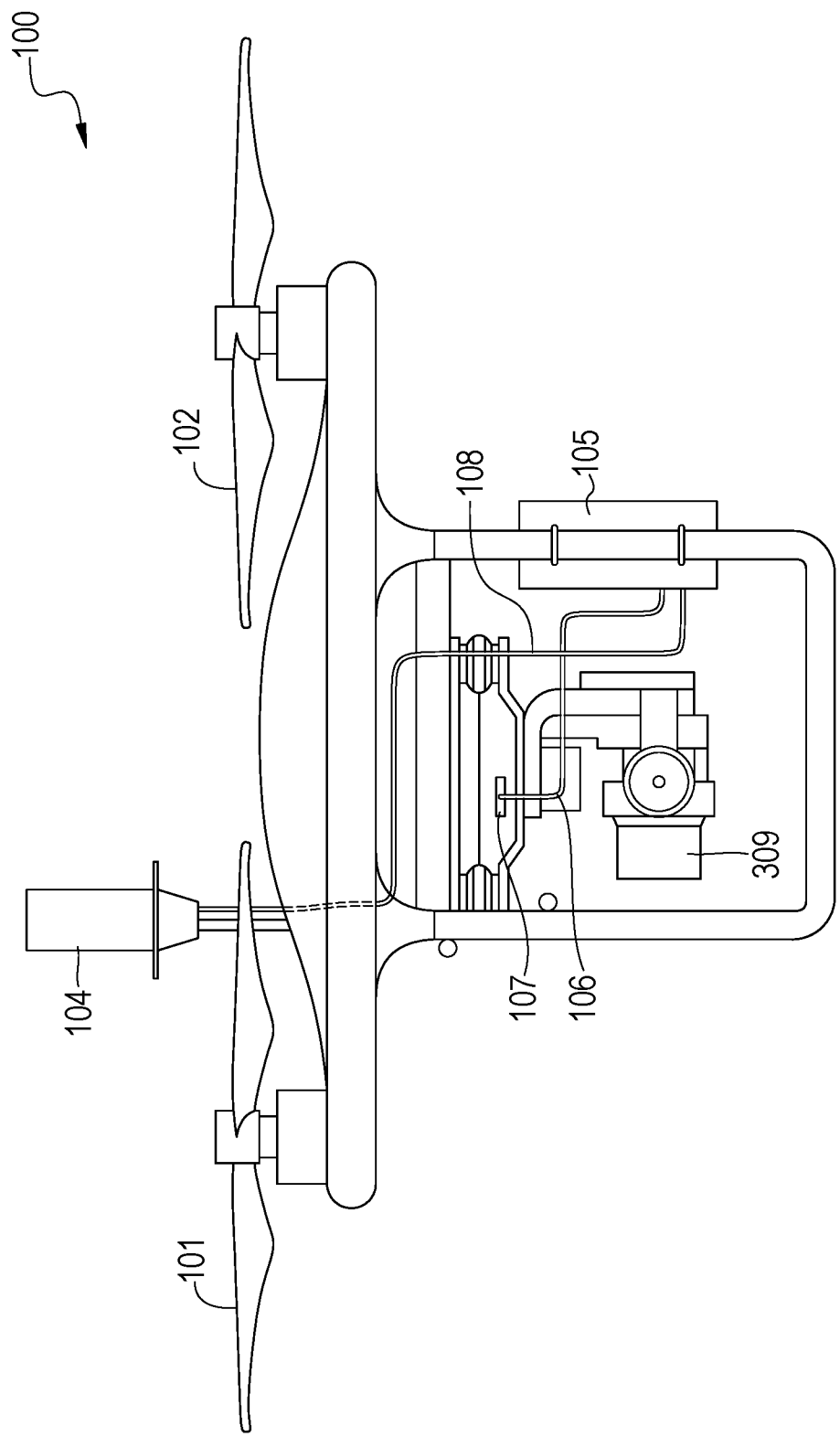
FIG. 2 is a side view of the drone such as is depicted in FIG. 1.

FIG. 2 is a side view of the drone 100 in accordance with an embodiment of the present disclosure. The side view shows the propellers 101 and 102 that are coupled to the body 109. Additionally, the side view depicts the camera 309, the DPS box 105, and the antenna 104 all coupled to the frame 110.

The antenna 104 is coupled to the DSP box 105 via the cable 108. Further, the modified SD card 111 is inserted into the SD port 107. The modified SD card 111 is coupled to the DSP housing 105 via the cable 106.

Figure 3:
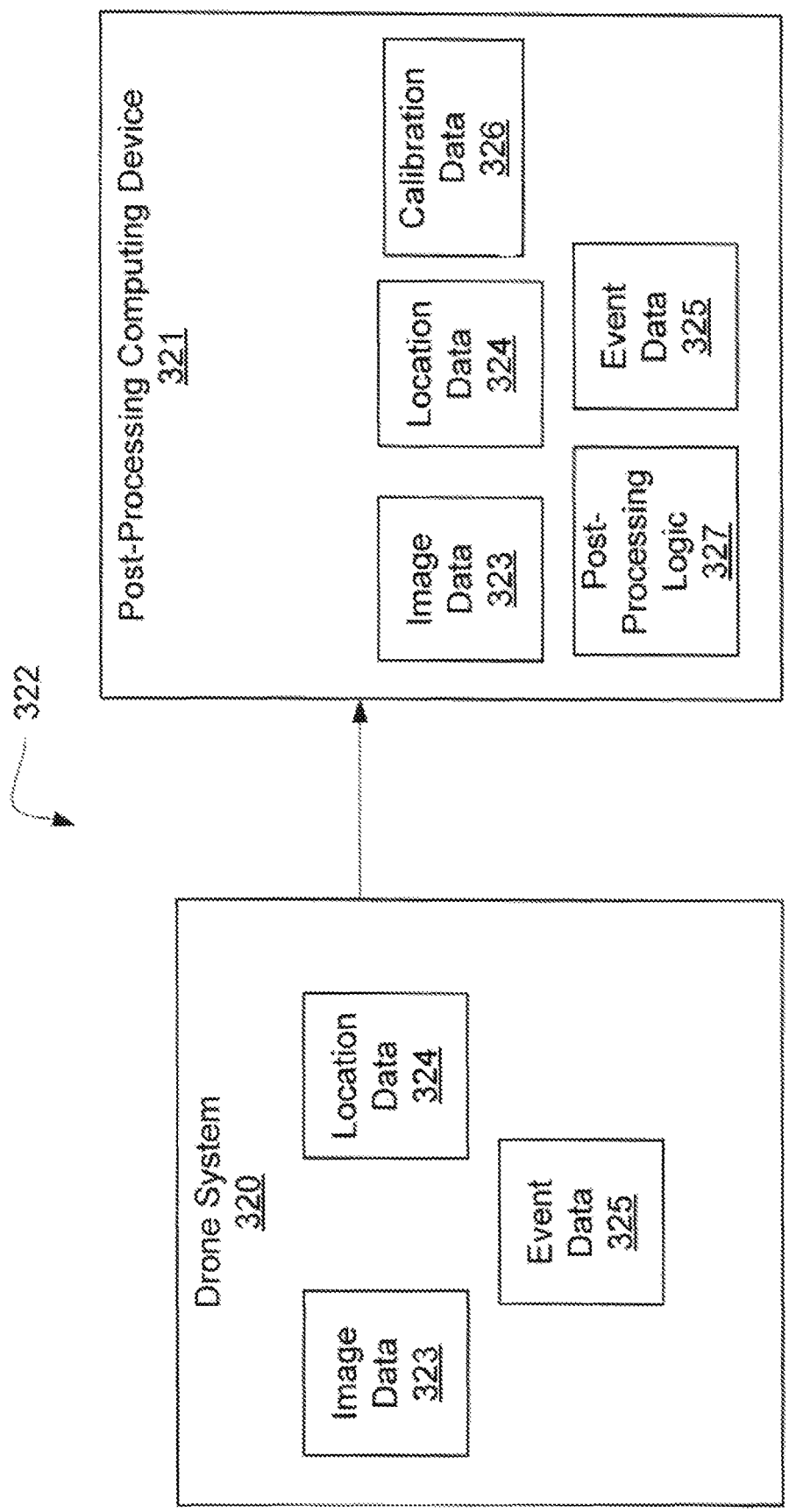
FIG. 3 is a block diagram of a processing system in accordance with an embodiment of the present disclosure.

FIG. 3 is a processing system 322. The processing system 322 comprises a drone system 320 and a post-processing computing device 321. The post-processing computing device comprises a processor, memory, and input/output devices. In operation, the drone system captures image data 324 via the camera 309 (FIG. 2) that is written to the modified SD card 111 (FIG. 2). Note that each image capture may be hereinafter referred to as an event.

Additionally, the drone system 320 periodically captures location data 324 of the drone 100. For example, the drone system 320 may capture location data ten times per second. Note that each location captured is associated with a particular time.

Furthermore, the drone system 320 captures event data 325 that represents where in the event data 324 an image is captured in the image data 323. Each event in the event data is also associated with a particular time.

In post-processing, the image data 323, the location data 324, and the event data 324 are transferred to the post-processing computing device 321. Once the image data 323, the location data 324, and the event data 234 are transferred to the post-processing computing device 321, post-processing logic 327 matches each image in the image data 323 to a location in the location data 324 to determine the exact location of the drone 100 (FIG. 1) when the image was acquired by matching time data in the location data 324 with time data in the event data 325 based upon the time stamps of the events in the event data 325 and the location data 324.

Also note in one embodiment, the post-processing computing device 321 may further comprise calibration data 326. Calibration data 326 is described further with reference to FIG. 6. However, for purposes here, the calibration data 326 represents a delay between when the camera 309 takes a photograph and when the image is written to the modified SD card 111. This delay is used to determine the exact time that a photograph is taken.

Figure 4:
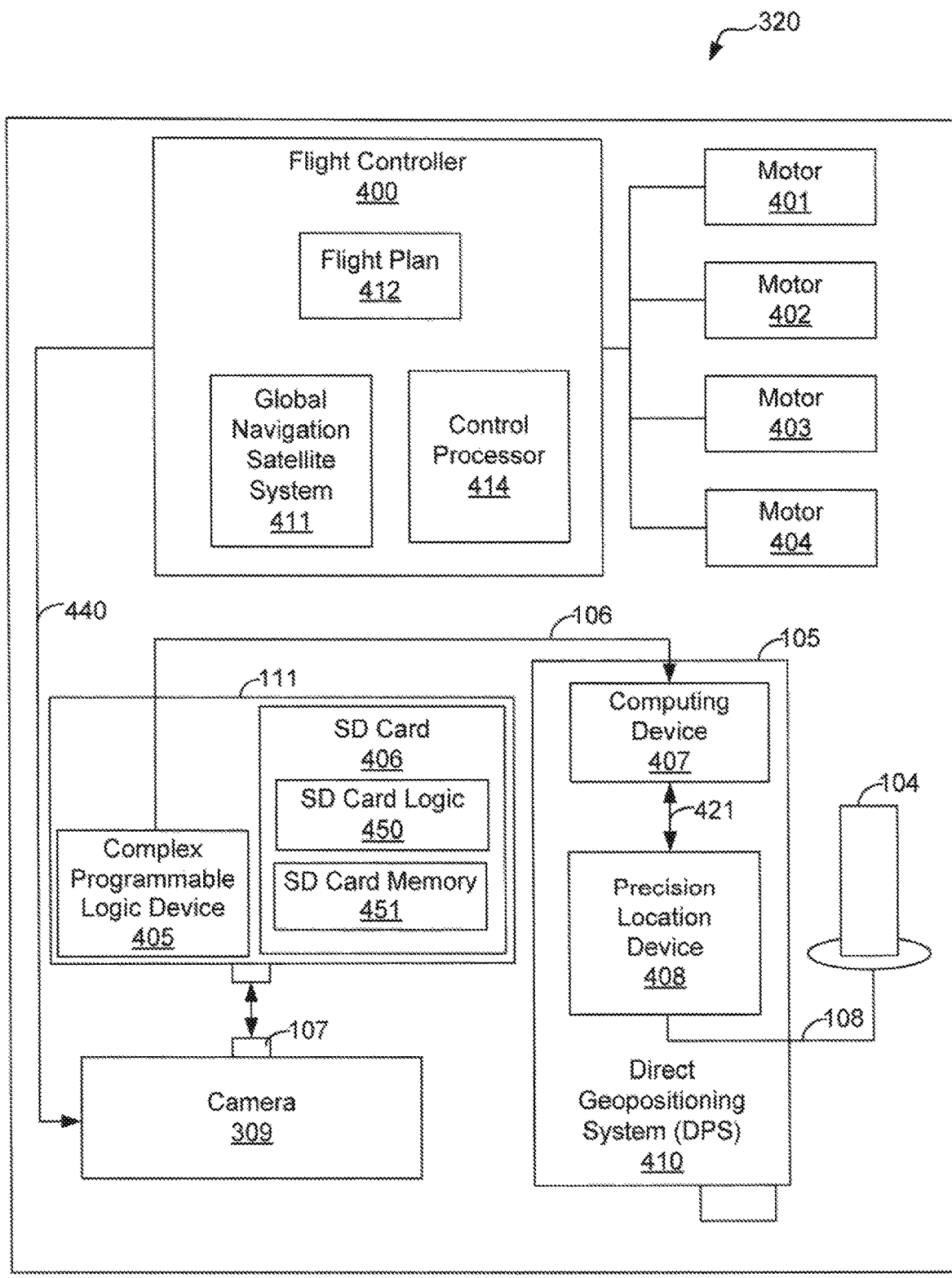
FIG. 4 is an exemplary drone system in accordance with an embodiment of the present disclosure as is depicted in FIG. 3.

FIG. 4 is a block diagram illustrating the exemplary drone system 320 implemented in the drone 100 (FIG. 1) in accordance with an embodiment of the present disclosure.

The drone system 320 comprises a flight controller 400. The flight controller 400 comprises a global navigation satellite system 411, flight plan data 412, and a control processor 414. Among other operations, the control processor 414 operates one or more motors 401-404 that activate propellers 101-103 (FIG. 1) to fly the drone 100. Notably, the control processor 412, in accordance with the flight plan data 412, directs the propellers to move along the trajectory defined in the flight plan data 412. In this regard, the global navigation satellite system (GNSS) 411 aids in directing the drone along the identified flight plan data 412 by monitoring the latitude, longitude, and elevation of the drone 100 as the drone 100 moves in accordance with the flight plan data 412.

As indicated, the control processor 414 directs the drone 100 via the flight plan data 412 that is loaded onto the flight controller 400 to fly to a given latitude, longitude, and elevation. During movement of the drone 100 to the directed latitude, longitude, and elevation, the control processor 414 transmits a signal to the camera 309 via connection 440 signaling the camera 309 to take a photograph of a target also in accordance with the loaded flight plan data 412. Note that the connection 440 may be, for example, a cable. As a mere example, the flight plan 412 may direct the camera to take a photograph when traveling from point A to point B. In other examples, the flight plan 412 may direct the camera to take a picture every two seconds or every two meters along the trajectory of the drone 100.

Note that during operation, there is no way of knowing when the control processor 411 transmits a signal to the camera 309 to take a photograph. Additionally, when the camera 309 receives the signal to take a photograph, there may be some delay between when the camera 309 receives the signal and when the camera 309 takes the picture. In this regard, the camera may perform operations prior to taking the picture, e.g., auto focus, setting aperture, waiting for data to write, etc. Thus, given the limited system there is no way to know when the photograph is taken.

The system 320 further comprises a modified SD card 111. The modified SD card 111 comprises an SD Card 406. The SD card 406 comprises SD card logic 450 and SD card memory 451. Note that the complex programmable logic device 406 may be hardware, software, or a combination thereof that is executed during operation.

The system 320 further comprises the DPS housing 105 that houses a DPS 410. The DPS 410 comprises a computing device 407 and a precision location device 408. The computing device 407 is communicatively coupled to the modified SD card 111 via the connection 106. In one embodiment, the connection 106 is a cable that couples the modified SD card 111 to the computing device 407.

Further, the computing device 407 is communicatively coupled to the precision location device 408 via a connection 421. Additionally, the precision location device 408 is coupled to the antenna 104 via the connection 108. In one embodiment, the connection 108 is a cable.

As indicated hereinabove, during operation, the flight controller 400 directs the drone 100 along a trajectory and signals the camera 309 to periodically take a photograph, as described above. When the camera 309 takes a photograph, the camera 309 sends a signal to the modified SD card 111 that a photograph has been taken. The SD card logic 450 stores image data 323 (FIG. 3) in the SD card memory 451, which is data indicative of the photograph taken. Note that the listing of the images in the image data 323 can indicate when an event has occurred. For example, the first image is event 1, the second image is event 2, and so forth. Other methods may be employed to determine when an image is taken and the corresponding event.

During operations, the complex programmable logic 405 listens for a command that is transmitted to the SD card circuitry 406 that a photograph has been taken. In response to receiving the signal indicating that a photograph has been taken, the complex programmable logic device 405 transmits a signal to the computing device 407 via the cable 106 that a photograph has been taken. This is hereinafter referred to as a mid-exposure pulse.

The computing device 407 transmits the mid-exposure pulse to the precision location device 408 that the photograph has been taken. In response, the precision location device 408 records event data 325 (FIG. 3) that comprises an event number and a particular time. Note that in addition, the precision location device 408 is continually recording location data 324 (FIG. 3) via the antenna 104 and associated with a particular time.

Note that the number of images for which data has been collected correspond to a particular event number, and data indicative of the photograph and data indicative of the event are stored in memory 451, i.e., image 1, image 2, and image 3, can indicate event 1, event 2, and event 3, respectively. Further, for each mid-exposure signal that is transmitted to the computing device 407 and transmitted to the precision location device 408, data is stored comprising the event number and a time, i.e., event 1 time 1; event 2, time 2; event 3, time 3; etc. Furthermore, the precision location device 408 stores data indicative of the location of the drone (x, y, and z) and a corresponding time the location was obtained, i.e., x1, y1, z1, time 1; x2, y2, z2, time 2; x3, y3, z3, time 3; etc.

Figure 5:
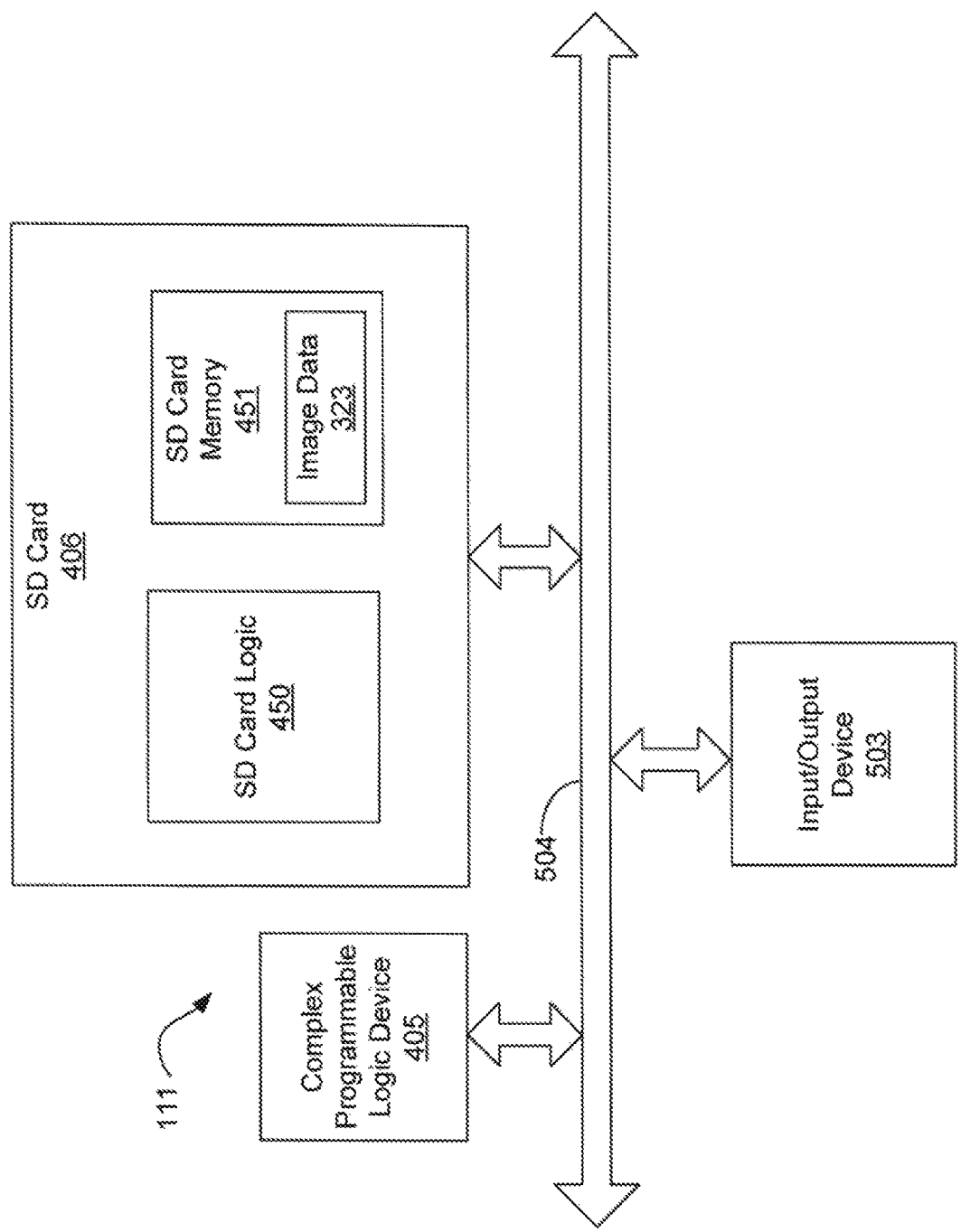
FIG. 5 is a block diagram of an exemplary secure digital card in accordance with an embodiment of the present disclosure as depicted in FIG. 2.

FIG. 5 depicts an exemplary embodiment of the SD card 111 shown in FIGS. 1, 2, and 4. As shown by FIG. 5, the modified SD card 111 comprises an SD Card 406 and complex programmable logic device (CPLD) 405. The SD card 406 comprises the SD card logic 450 and the SD card memory 451, which stores image data 323. Note that the image data contains photographs taken in order that is every time there is an event, i.e., an image is written to the SD card memory 451, the image data 323 is in the order that the event occurs. Additionally, the modified SD card 111 comprises an input/output device 503 that communicates with the other elements over the bus 504.

As noted above, the image data 323 is in the order in which the picture is taken. Further, the location data 324 comprises x, y, and z coordinates associated with a particular time. Additionally, the event data has an event marker that is also associated with a particular time. Thus, the post-processing logic 327 (FIG. 3) matches the event, i.e., when the picture is taken, with the event data 325, and the post-processing logic 327 matches the time the event occurs with the particular time in the location data 324 to obtain the exact location of drone 100 (FIG. 1) when the event occurs.

During operation, the camera 309 (FIG. 3) transmits commands to the modified SD card 111. One such command, or series of commands, indicates that the camera 309 is preparing to write image data 323 indicative of a photograph acquired by the camera 309. The SD card logic 450 recognizes the commands and in response stores image data 323 to the memory 451.

Additionally, the CPLD 405 intercepts the commands from the camera 309 via the input/output device 503. In response to a command that the camera 309 is preparing to write image data 323 to the camera, the CPLD 400 transmits a mid-exposure pulse to the DPS 410 (FIG. 4). The computing device 407 (FIG. 4) transmits the mid-exposure pulse to the precision location device 408 (FIG. 4), which records the event corresponding to a particular time. Note that the precision location device 408 is also recording location data at periodically.

Figure 6:
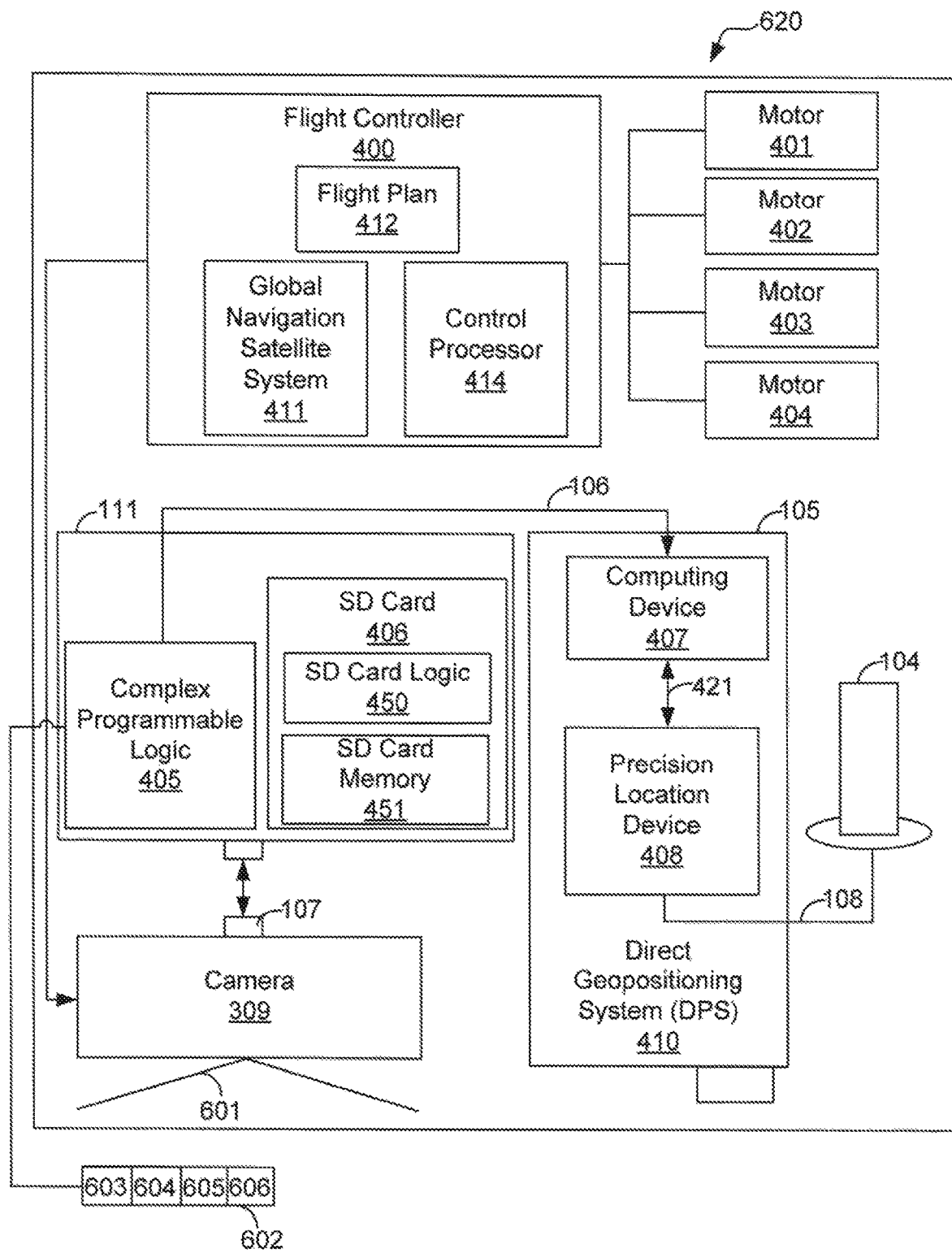
FIG. 6 is the drone system such as is depicted in FIG. 1 further comprising a light-emitting diode for calibration.

In one embodiment of the present disclosure, the time delay between when the camera 309 (FIG. 2) takes a photograph and the time the image is written to the modified SD card 111 (FIG. 2) is determined. FIG. 6 depicts a drone system 620 for precisely determining the time delay between when the camera 309 takes the photograph and when the image is written to the modified SD card 111.

In a lab setting, a four-position light-emitting diode 602, which is hereinafter referred to as a counter, is placed in the field of view 601 of the camera-under-test. The counter 602 is manually started. Thus, the counter 602 is incrementing. When the camera-under-test takes a photograph, at some time later, the camera-under-test takes a photograph of the counter 602 in its field of view 601. This is the exact time of the camera exposure. There is some delay, as described hereinabove, between when the camera takes a photograph and when the camera writes the image to the storage device 406.

In operation, when the camera 309 writes an image to the SD card 406, the complex programmable logic 405 intercepts the commands. Upon interception of a command that the image is written to the SD card memory 451, the complex programmable logic 405 transmits a signal to the counter 602 that stops the counter 602. Thus, the true exposure time is captured in the recorded image between when the camera-under-test takes the photograph and when the image is written to the SD card memory 451. The computed exposure time is visible on the stopped counter.

In one embodiment, the time recorded by the image is subtracted from the display time on the counter 602. This amount is then multiplied by the count to seconds conversion factor, e.g., if the counter increments by one every millisecond, the difference is multiplied in the two counts by 0.001 to get the delay in seconds. This delay in seconds is the calibration data 326 (FIG. 3), which is used to determine the exact location of the drone when an image is taken.

Figure 7:
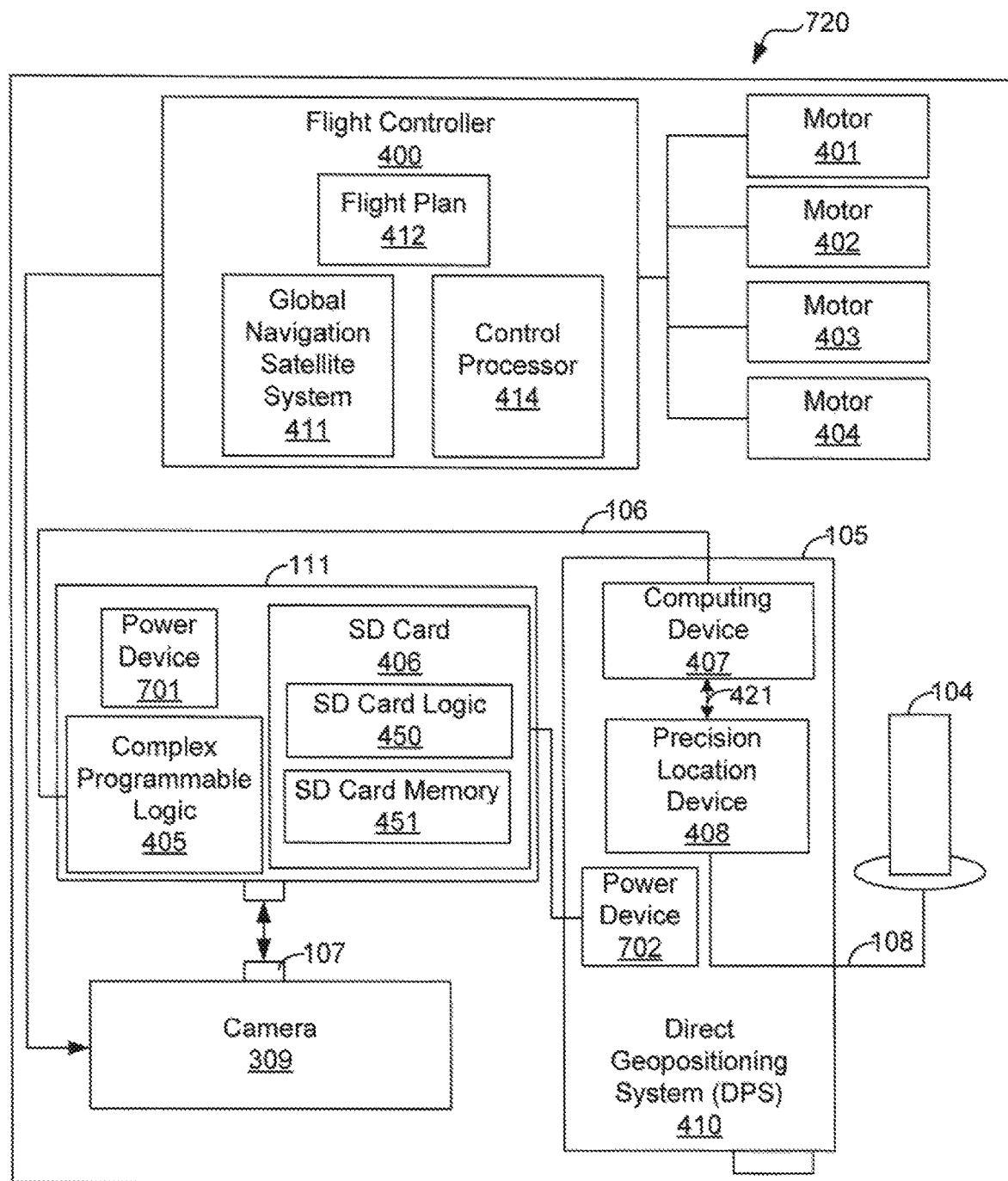
FIG. 7 is the drone system such as is depicted in FIG. 1 further comprising a power source on a secure digital (SD) card and a power source on a direct geopositioning system (DPS).

FIG. 7 depicts another embodiment of a drone system 720. The drone system 720 comprises a power device 701 on the modified SD card 111. Additionally, the drone system 720 comprises a power device 720 on the DPS 410.

Note that the DPS 105 is externally mounted to the frame 110 (FIG. 2) that carries the camera 309. The impetus of the present disclosure is to minimize the cables that are routed from the frame 110 to the DPS 105 and minimize the weight of the DPS 105.

To effectively meet these two goals, power for the DPS 410 is drawn from the power device 701 on the modified SD card 111. However, there may not be power available from the modified SD card 111 to power both the modified SD card 111 and the DPS 105. Thus, a power device 702 of minimal weight, such as for example a battery, is included in the DPS 410. Note however that this power device 702 may not be sufficient for supplying power to the DPS 410 at all times.

There are times when the modified SD card 111 draws minimal current during its quiescence state, e.g., when no input/output operations are taking place. In the embodiment depicted in FIG. 7, the DPS 410 only draws current from the modified SD card 111 during this quiescence state. The current drawn from the power device 701 is used to charge the power device 702.

Figure 8:
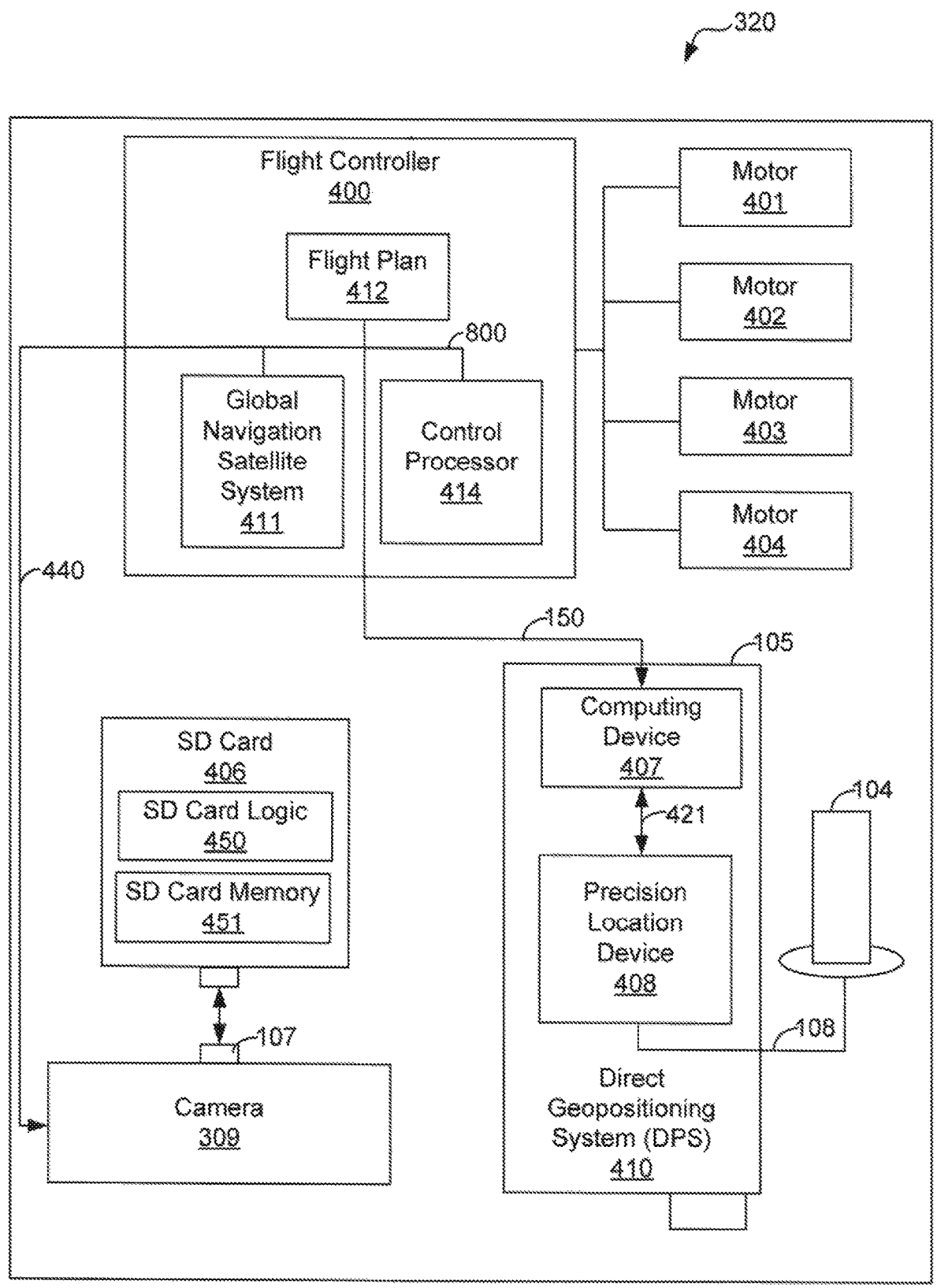
FIG. 8 is another embodiment of the drone system of FIG. 1 wherein a camera and a DPS is communicatively coupled to a bus that transmits data from a control processor and a global navigation satellite system.

FIG. 8 is another embodiment of a drone system 320 in accordance with an embodiment of the present disclosure. In the embodiment depicted, a bus 800 couples the global navigation satellite system 411, the flight plan 412, and the control processor 414. Additionally, the bus 800 is coupled via connection 440 to the camera 309. Signals are transmitted over the bus for directing the flight of the drone 100 (FIG. 1).

In the embodiment depicted, a connection 150 couples the bus 800 to the computing device 407. Note that this connection may be, for example, a cable.

As noted hereinabove, the flight controller 400 comprises a global navigation satellite system 411, flight plan data 412, and a control processor 414. Among other operations, the control processor 414 operates one or more motors 401-404 that activate propellers 101-103 (FIG. 1) to fly the drone 100. Notably, the control processor 412, in accordance with the flight plan data 412, directs the propellers to move along the trajectory defined in the flight plan data 412. In this regard, the global navigation satellite system (GNSS) 411 aids in directing the drone along the identified flight plan data 412 by monitoring the latitude, longitude, and elevation of the drone 100 as the drone 100 moves in accordance with the flight plan data 412.

The control processor 414 directs the drone 100 via the flight plan data 412 that is loaded onto the flight controller 400 to fly to a given latitude, longitude, and elevation. Daring movement of the drone 100 to the directed latitude, longitude, and elevation, the control processor 414 transmits a signal to the camera 309 via connection 440 signaling the camera 309 to take a photograph of a target also in accordance with the loaded flight plan data 412. Note that the connection 440 may be, for example, a cable. As a mere example, the flight, plan 412 may direct the camera to take a photograph when traveling from point A to point B. In other examples, the flight plan 412 may direct the camera to take a picture every two seconds or every two meters along the trajectory of the drone 100.

In operation, as the control processor 414 signals the camera 309 to take a photograph, a signal is transmitted over connection 440. The connection 150 intercepts this signal to the camera 309. The signal is received by the computing device 407, and is transmitted to the precision location device 408 via connection 421.

As indicated above, the precision location device 408 is continuously obtaining location data 324 (FIG. 3) associated with a time. In response to receipt of the intercepted signal, the precision location device 408 writes event data 325 (FIG. 3) that includes an event identifier and a time.

As noted above, the location data 324, the image data 323 (FIG. 3), and the event data 325 are transmitted to the post-processing computing device 321. The post-processing logic 327 (FIG. 3) uses the location data 324, the event data 325, and the image data 323 to determine the exact trajectory of the drone 100 during flight.

Figure 9:
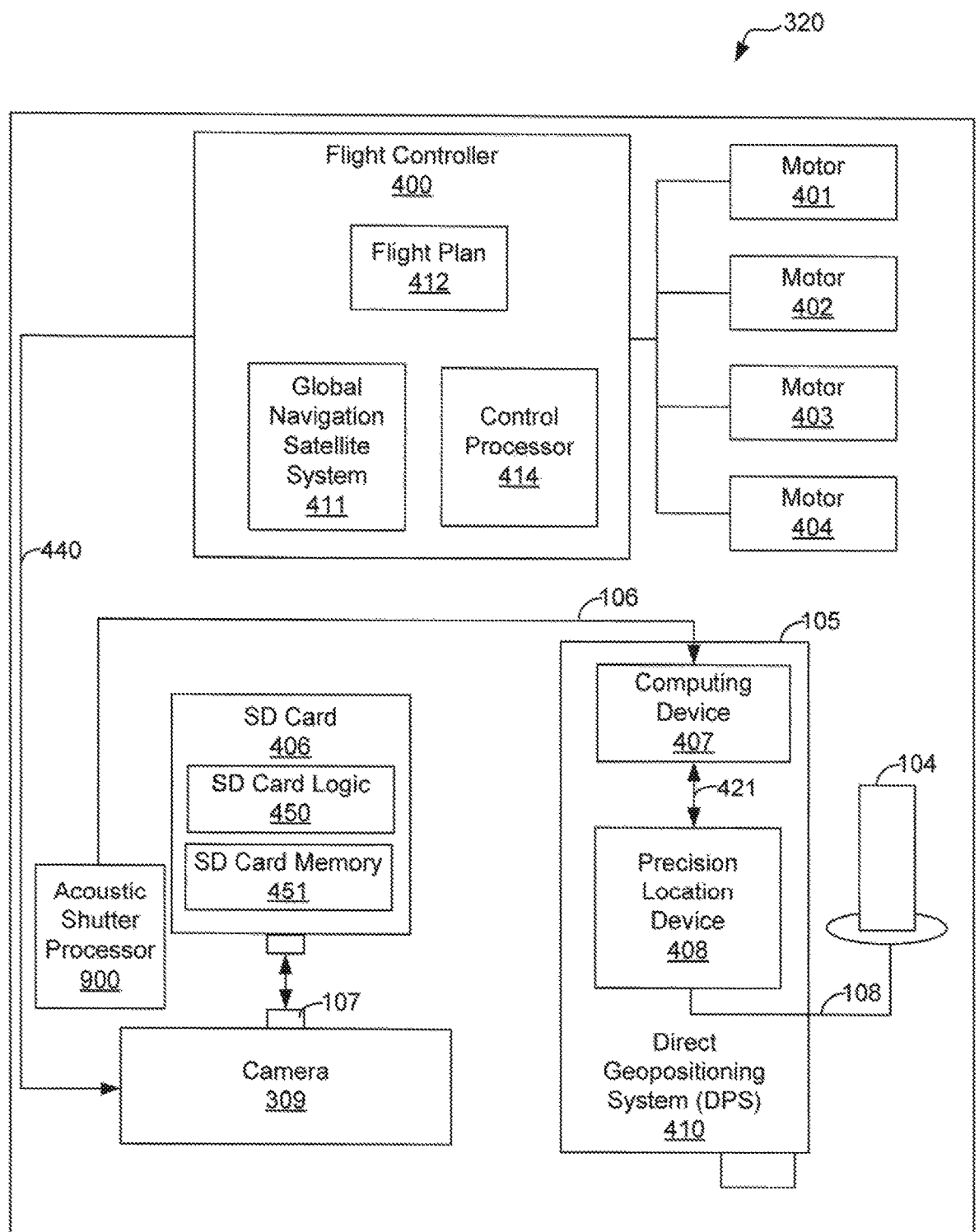
FIG. 9 is another embodiment of the drone system of FIG. 1 further comprising an acoustic shutter processor.

FIG. 9 is another drone system 320 in accordance with an embodiment of the present disclosure. As indicated above, the control processor 414 directs the drone 100 via the flight plan data 412 that is loaded onto the flight controller 400 to fly to a given latitude, longitude, and elevation. During movement of the drone 100 to the directed latitude, longitude, and elevation, the control processor 414 transmits a signal to the camera 309 via connection 440 signaling the camera 309 to take a photograph of a target, also in accordance with the loaded flight plan data 412. Note that the connection 440 may be, for example, a cable. As a mere example, the flight plan 412 may direct the camera to take a photograph when traveling from point A to point B. In other examples, the flight plan 412 may direct the camera to take a picture every two seconds or every two meters along the trajectory of the drone 100.

In the embodiment depicted in FIG. 9, drone system 320 further comprises an acoustic shutter processor 900 within proximity to the camera 309. This is any type of device that can audibly detect that the shutter of the camera 309 has activated thereby taking a photograph. The acoustic shutter processor 900 is coupled to the computing device 407 via a connection 106, which may be, for example, a cable.

In operation, the control processor 414 transmits a signal via connection 440 to the camera 309 directing the camera to take a photograph. When the shutter activates to take the photograph, the acoustic shutter listening device 900 detects the shutter activation. In response, the acoustic shutter listening device 900 transmits a signal to the computing device 407 indicating that the shutter has activated. The computing device 407 transmits a signal to the precision location device 308 via connection 421 that a photograph has been taken.

As indicated above, the precision location device 408 is continuously obtaining location data 324 (FIG. 3) associated with a time. In response to receipt of the signal indicating that the shutter has activated, the precision location device 408 writes event data 325 (FIG. 3) that includes an event identifier and a time.

As noted above, the location data 324, the image data 323 (FIG. 3), and the event data 325 are transmitted to the post-processing computing device 321. The post-processing logic 327 (FIG. 3) uses the location data 324, the event data 325, and the image date 323 to determine the exact trajectory of the drone 100 during flight.

Figure 10:
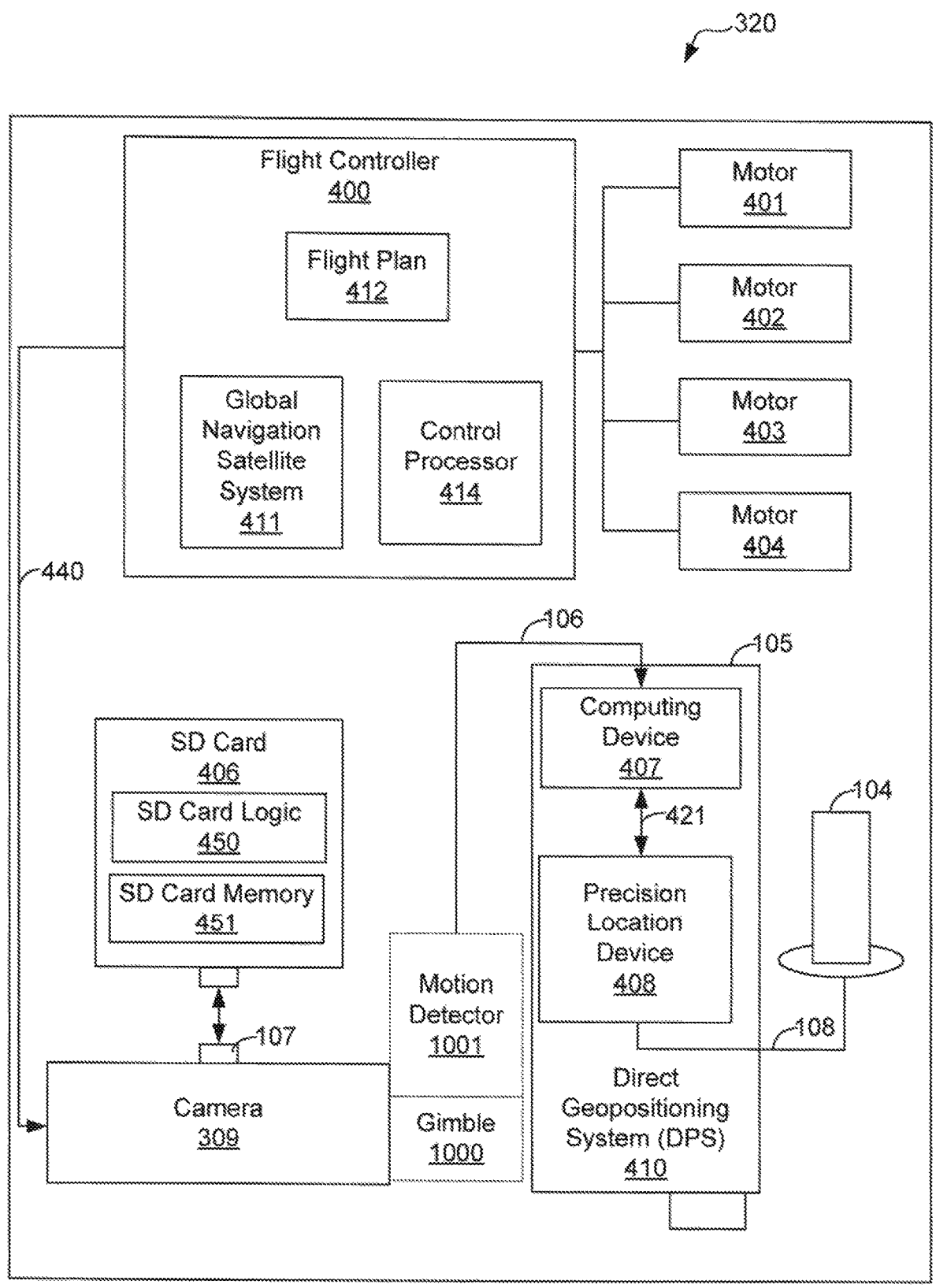
FIG. 10 is another embodiment of the drone system of FIG. 1 further comprising a motion detector and a gimbal.

FIG. 10 is another drone system 320 in accordance with an embodiment of the present disclosure. Note that the camera 309 is mounted to a movable gimbal 1000. Thus, during operation, the camera 309 can move to different positions prior to taking a photograph. Once the camera 309 has stopped moving, the image is acquired.

The drone system 320 further comprises a motion detector 1001. The motion detector 1001 is coupled to the computing device 407 via a connection 106. Further, the motion detector is within proximity to the gimbal 1000 and detects movement of the gimbal 1001. When the gimbal stops moving to acquire an image, the motion detector 1001 detects the lack of movement and transmits a signal to the computing device 407 via connection 407. The computing device 407 transmits a signal to the precision location device 308 via connection 421 that a photograph has been taken.

As indicated above, the precision location device 408 is continuously obtaining location data 324 (FIG. 3) associated with a time. In response to receipt of the signal indicating that the shutter has activated, the precision location device 408 writes event data 325 (FIG. 3) that includes an event identifier and a time.

As noted above, the location data 324, the image data 323 (FIG. 3), and the event data 325 are transmitted to the post-processing computing device 321. The post-processing logic 327 (FIG. 3) uses the location data 324, the event data 325, and the image data 323 to determine the exact trajectory of the drone 100 during flight.

Figure 11:
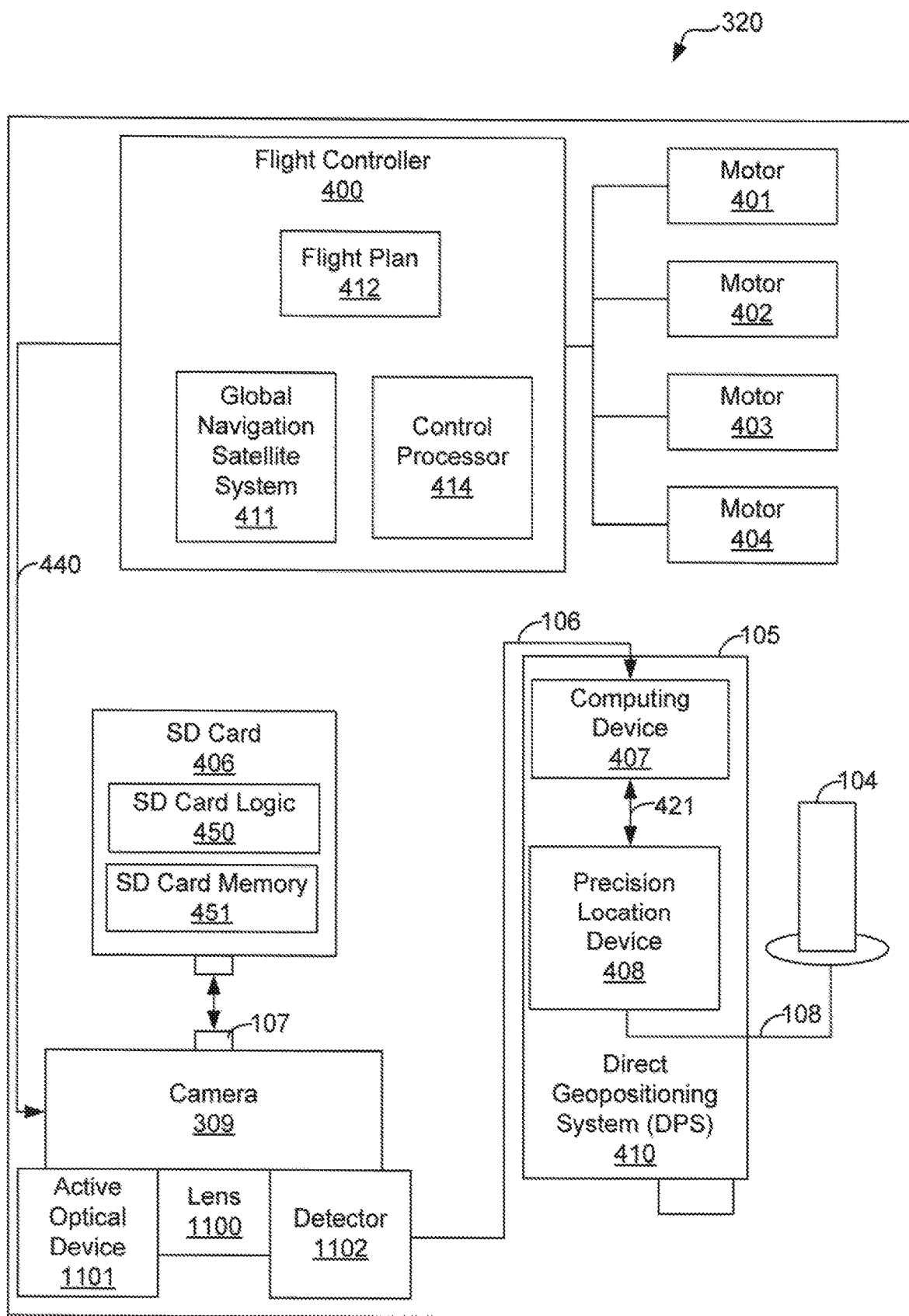
FIG. 11 is another embodiment of the drone system of FIG. 1 further comprising an active optical device and a detector.
Figure 12:
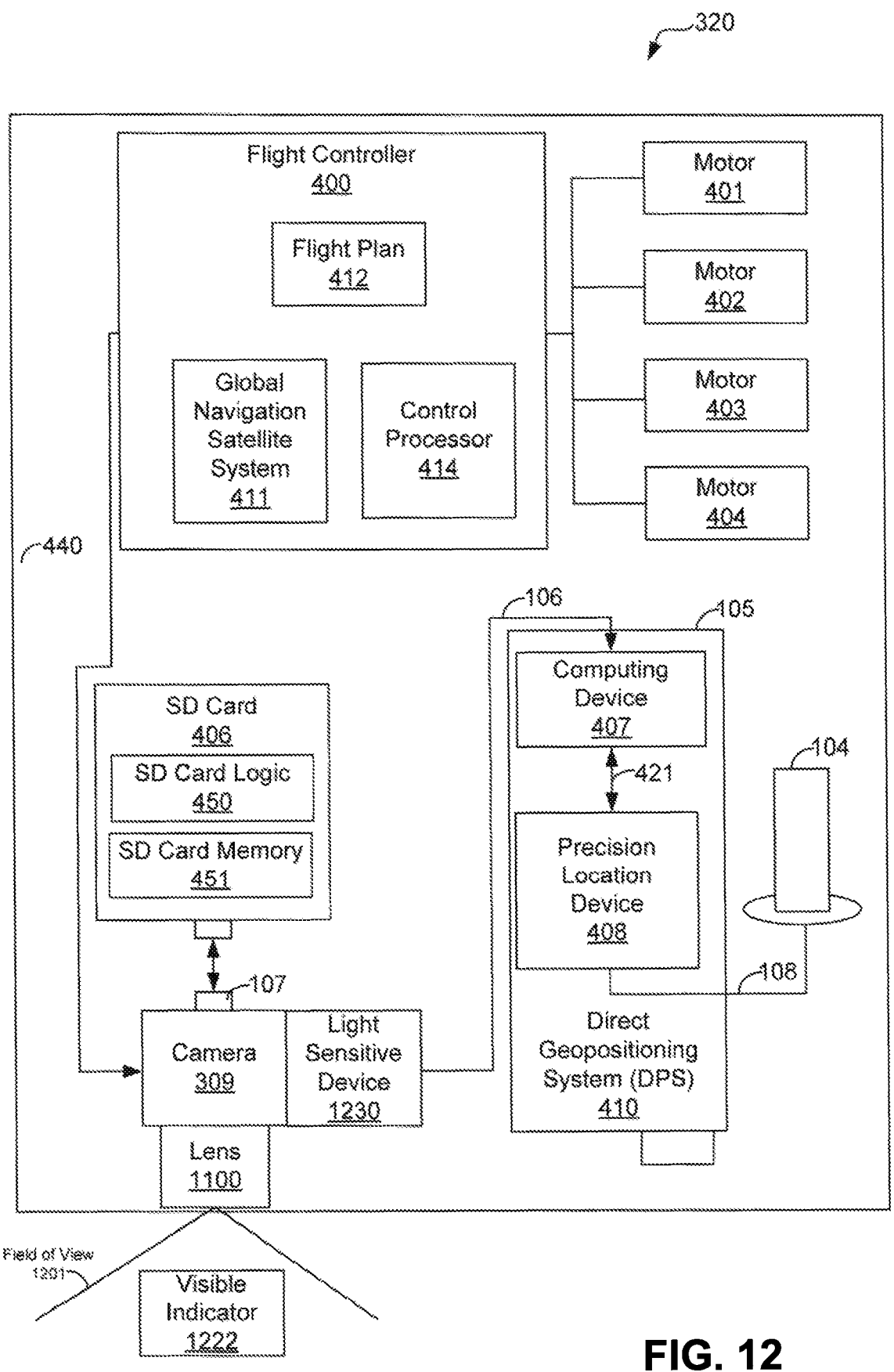
FIG. 12 is another embodiment of the drone system of FIG. 1 further comprising a light sensitive device.

FIG. 11 is another drone system 320 in accordance with an embodiment of the present disclosure. The drone system 320 in FIG. 11 comprises an active optical device 1101 and a detector 1101. The optical device 1101 and the detector 1101 are positioned on either side of a lens 1100 of the camera 309.

In operation, the optical device 1101 shines a light toward the lens 1100, which is detectable by the detector 1102. When the lens 1100 activates, the light is interrupted, which is detected by the detector 1102. In response, the detector 1102 transmits a signal indicating that the lens 1100 has activated. The computing device 407 transmits a signal to the precision location device 308 via connection 421 that a photograph has been taken.

As indicated above, the precision location device 408 is continuously obtaining location data 324 (FIG. 3) associated with a time. In response to receipt of the signal indicating that the lens 1100 has activated, the precision location device 408 writes event data 325 (FIG. 3) that includes in event identifier and a time.

As noted above, the location data 324, the image data 323 (FIG. 3), and the event data 325 are transmitted to the post-processing computing device 321. The post-processing logic 327 (FIG. 3) uses the location data 324, the event data 325, and the image data 323 to determine the exact trajectory of the drone 100 during flight.

FIG. 10 is another drone system 320 in accordance with an embodiment of the present disclosure. In the embodiment depicted, the camera is strobing a visible indicator 1222. The visible indicator may be, for example, a light emitting diode (LED). The drone system 320 further comprises a light sensitive device 1230. The light sensitive device may be, for example, a photo-transistor that is positioned to detect the strobing visible indicator 1222.

In response, the light sensitive device 1230 transmits a signal indicating that a photograph has been taken to the computing device 407. The computing device 407 transmits a signal to the precision location device 308 via connection 421 that a photograph has been taken.

As indicated above, the precision location device 408 is continuously obtaining location data 324 (FIG. 3) associated with a time. In response to receipt of the signal indicating that a photograph has been taken, the precision location device 408 writes event data 325 (FIG. 3) that includes an event identifier and a time.

As noted above, the location data 324, the image data 323 (FIG. 3), and the event data 325 are transmitted to the post-processing computing device 321. The post-processing logic 327 (FIG. 3) uses the location data 324, the event data 325, and the image data 323 to determine the exact trajectory of the drone 100 during flight.

The invention claimed is:

1. A drone system, comprising:
   a camera configured for taking photographs of a plurality of locations during a flight, each photograph is acquired when, upon receipt of a camera signal from a flight controller, the camera takes a photograph; and
   a drone, the camera mounted to a frame of the drone, the drone configured for transmitting the camera signal to the camera signaling the camera to take a photograph at a recorded acquisition time, the drone further configured for continuously obtaining location data comprising event data and location data related to the drone flight, the drone is further configured to continuously listen for the audible camera signal, and when the camera signal occurs, the drone is configured for transmitting a signal to an antenna to obtain coordinate data associated with the location of the drone when the photograph is taken and for recording an event number associated with when the photograph was taken, the drone further configured for matching each photograph taken to one of the plurality of locations based upon the coordinate data and the recorded acquisition time.

2. The drone system of claim 1, wherein the flight controller comprising a global navigation satellite system, a control processor, and a flight plan.

3. The drone system of claim 2, wherein the global navigation system directs the drone along a flight trajectory.

4. The drone system of claim 3, wherein the control processor directs the drone along the flight trajectory based upon the flight plan.

5. The drone system of claim 4, wherein the control processor commands the camera to acquire an image based upon the flight plan.

6. The drone system of claim 1, wherein the location data is associated with a time.

7. The drone system of claim 6, wherein the precision location device is further configured to record event data indicative of the event number and the time.

8. The drone system of claim 7, wherein the drone system transmits data indicative of the image data, the location data, and the event data to a post-processing computing device.

9. The drone system of claim 8, wherein the post-processing computing device is configured to determine the location of the drone when the camera acquired the image data based upon the image data, the location data, and the event data.

10. The drone system of claim 9, wherein the post-processing computing device is configured to match the time in the location data with the time in the event data and determine the location of the drone when the image data was acquired.

11. The drone system of claim 1, wherein the drone system further comprises a counter in the field of view of the camera.

12. The drone system of claim 11, wherein the counter is manually started.

13. The drone system of claim 12, wherein when the camera acquires an image, the drone is configured to transmit a signal to the counter to stop operation of the counter.

14. The drone system of claim 13, wherein the difference between when the image is acquired and the time on the counter is indicative of calibration data.

15. The drone system of claim 14, further comprising a post-processing computing device.

16. The drone system of claim 15, wherein the post-processing computing device is configured to determine the location of the camera when the camera acquires the image based upon the image data, the location data, the event data, and the calibration data.

17. The drone system of claim 1, wherein a secure digital card configured for storing image data comprises a first power device.

18. The drone system of claim 17, wherein a direct geopositioning system comprises a second power device.

19. The drone system of claim 18, wherein when the first power device is in a quiescent state, the second power device draws power from the first power device.

20. The drone system of claim 1, wherein a secure digital (SD) card is inserted into the drone.

21. The drone system of claim 20, wherein the SD card is configured to intercept a message indicating when an image is written to the SD card.

22. The drone system of claim 21, wherein the SD card is configured to transmit a signal indicating when the image is acquired and the drone is further configured to transmit the signal indicating when the image is acquired.

23. The drone system of claim 22, wherein the drone is configured to record event data associated with a time indicating when the image is acquired based upon the signal from the SD card.

24. The drone system of claim 1, wherein the flight controller is configured to communicate over a bus with the camera.

25. The drone system of claim 24, wherein the drone is further configured to intercept a signal from the bus that the flight controller transmits to the camera to acquire an image.

26. The drone system of claim 25, wherein the drone is further configured to transmit a signal indicating when the image is acquired.

27. The drone system of claim 26, wherein the drone is configured to record event data associated with a time indicating when the image is acquired based upon the signal from the drone.

28. The drone system of claim 1, further comprising an acoustic shutter processor located within proximity to the camera.

29. The drone system of claim 28, wherein the acoustic shutter processor is configured to detect when the camera acquires an image and to transmit a signal to the drone indicating when the image is acquired.

30. The drone system of claim 29, wherein the drone is further configured to transmit the signal indicating when the image is acquired.

31. The drone system of claim 30, wherein the drone is configured to record event data associated with a time indicating when the image is acquired based upon the camera signal from the drone.

32. The drone system of claim 1, wherein the camera is mounted to a movable gimbal.

33. The drone system of claim 32, further comprising a motion detector in proximity to the movable gimbal.

34. The drone system of claim 33, wherein when the motion detector detects that the gimbal is stationary, the motion detector transmits a signal to the drone indicating when an image is acquired.

35. The drone system of claim 34, wherein the drone is further configured to transmit the signal indicating when the image is acquired.

36. The drone system of claim 35, wherein the drone is configured to record event data associated with a time indicating when the image is acquired based upon the signal from the computing device.

37. The drone system of claim 1, further comprising an active optical device and a detector positioned within proximity to a lens of the camera such that the active optical device transmits light detectable by the detector and when the lens activates, the light is interrupted.

38. The drone system of claim 37, wherein the detector is configured to transmit a signal to the drone indicating when an image is acquired.

39. The drone system of claim 38, wherein the drone is further configured to transmit a signal to the precision location device indicating when the image is acquired.

* * * * *